(12) United States Patent
Gassoway

(10) Patent No.: US 8,719,928 B2
(45) Date of Patent: *May 6, 2014

(54) METHOD AND SYSTEM FOR DETECTING MALWARE USING A REMOTE SERVER

(75) Inventor: Paul A. Gassoway, Norwood, MA (US)

(73) Assignee: CA, Inc., Islandia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/108,644

(22) Filed: May 16, 2011

(65) Prior Publication Data

US 2011/0219238 A1  Sep. 8, 2011

Related U.S. Application Data

(63) Continuation of application No. 11/735,163, filed on Apr. 13, 2007, now Pat. No. 7,945,787.

(51) Int. Cl.
*G06F 11/00* (2006.01)
*G06F 11/30* (2006.01)

(52) U.S. Cl.
USPC .................. 726/22; 726/23; 726/24; 713/188

(58) Field of Classification Search
USPC .................. 713/188; 726/22, 23, 24
See application file for complete search history.

(56) References Cited

U.S. PATENT DOCUMENTS

| | | | |
|---|---|---|---|
| 7,398,399 B2 * | 7/2008 | Palliyil et al. | 713/187 |
| 7,526,654 B2 * | 4/2009 | Charbonneau | 713/188 |
| 7,650,639 B2 | 1/2010 | Kramer et al. | 726/23 |
| 2003/0046348 A1 * | 3/2003 | Pinto et al. | 709/206 |
| 2004/0123117 A1 | 6/2004 | Berger | 713/188 |
| 2004/0158730 A1 * | 8/2004 | Sarkar | 713/200 |
| 2005/0132184 A1 | 6/2005 | Palliyil et al. | 713/152 |
| 2006/0015747 A1 * | 1/2006 | Van de Ven | 713/188 |
| 2006/0123244 A1 * | 6/2006 | Gheorghescu et al. | 713/188 |
| 2007/0028303 A1 | 2/2007 | Brennan | 726/24 |
| 2007/0234428 A1 | 10/2007 | Rash | 726/25 |
| 2008/0208935 A1 * | 8/2008 | Palliyil et al. | 707/204 |
| 2009/0019547 A1 * | 1/2009 | Palliyil et al. | 726/25 |
| 2009/0222923 A1 * | 9/2009 | Dixon | 726/24 |

* cited by examiner

*Primary Examiner* — Mohammad W Reza
(74) *Attorney, Agent, or Firm* — Baker Botts, L.L.P.

(57) ABSTRACT

The present disclosure is directed to a method and system for detecting malware using a remote server. In accordance with a particular embodiment of the present disclosure a hash value for a file is generated. The hash value is transmitted to a remote server. A notification is received from the remote server indicating whether the file comprises malware. At least one operation on the file is prevented if the notification indicates the file comprises malware.

20 Claims, 2 Drawing Sheets

METHOD AND SYSTEM FOR DETECTING MALWARE USING A REMOTE SERVER

CROSS-REFERENCE TO RELATED APPLICATION

This application is a continuation of U.S. application Ser. No. 11/735,163 filed Apr. 13, 2007 and entitled "Method and System for Detecting Malware Using a Remote Server", now U.S. Pat. No. 7,945,787 which issued May 17, 2011.

TECHNICAL FIELD

The present disclosure relates generally to computer security, and more particularly to a method and system for detecting malware using a remote server.

BACKGROUND

Computer security has become increasingly more important, particularly in order to protect against malware. Malware generally refers to any malicious computer program. For example, malware may include viruses, worms, spyware, adware, rootkits, and other damaging programs.

Malware may impair a computer system in many ways, such as disabling devices, corrupting files, transmitting potentially sensitive data to another location, or causing the computer system to crash. In addition, malware may be designed to conceal itself from software designed to protect a computer, such as antivirus software. For example, malware may infect components of a computer operating system and thereby filter the information that is provided to antivirus software.

SUMMARY

In accordance with the present invention, the disadvantages and problems associated with previous techniques for detecting malware may be reduced or eliminated.

In accordance with a particular embodiment of the present disclosure, a method for detecting malware using a remote server includes generating a hash value for a file. The method also includes transmitting the hash value to a remote server. The method further includes receiving a notification from the remote server indicating whether the file comprises malware. The method further includes preventing at least one operation on the file if the notification indicates the file comprises malware.

Technical advantages of particular embodiments of the present disclosure include a system and method for detecting malware using a remote server that provides protection against unknown malware. For example, hash values of new or updated files may be generated and transmitted to a remote server to detect the presence of malware. If malware is detected, users and system administrators may receive advisory messages indicating the presence of the malware.

Further technical advantages of particular embodiments of the present disclosure include a system and method for detecting malware using a remote server where the malware is designed to conceal itself. For example, pending operations on a particular file may be prevented until a remote server verifies the file. If malware is detected, the file may be restored to its previous state or deleted before it may impair a computer system.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF EXAMPLE EMBODIMENTS

A common defense against malware, such as computer viruses and worms, is antivirus software. Antivirus software identifies malware by matching patterns within data to what is referred to as a "signature" of the malware. Typically, antivirus software scans for malware signatures. However, most antivirus software with signature-based protection does not identify unknown malware.

Further, malware may be distributed as one or more programs designed to conceal the malware from antivirus software. Malware designed to conceal itself or other malware is generally referred to as a rootkit. For example, antivirus software designed to protect a computer from malware relies on an operating system to for information. If a rootkit is able to infect components of a computer operating system, the rootkit may control the information that is provided to the antivirus software.

In accordance with the teachings of the present disclosure, hash values of any new or updated files on a client are generated and transmitted to a remote server to detect the presence of malware. A hash value may refer to any fixed-length number or alphanumeric string generated according to a file's contents. Generally, if the file changes in any way, the hash value will change as well. For example, if an existing file changes into an executable file, the hash value would also change. Thus, by creating a hash value immediately after a file is created and again after any subsequent changes are made to the file, changes not made by any intended user of the system can be detected. If changes are detected, the user or administrator may be alerted to any changes to the files and may take any appropriate action to prevent malware from infecting the client. Thus, the method provides protection against malware, including unknown malware and rootkits. Additional details of example embodiments of the present disclosure are described in detail below.

Figure 1:
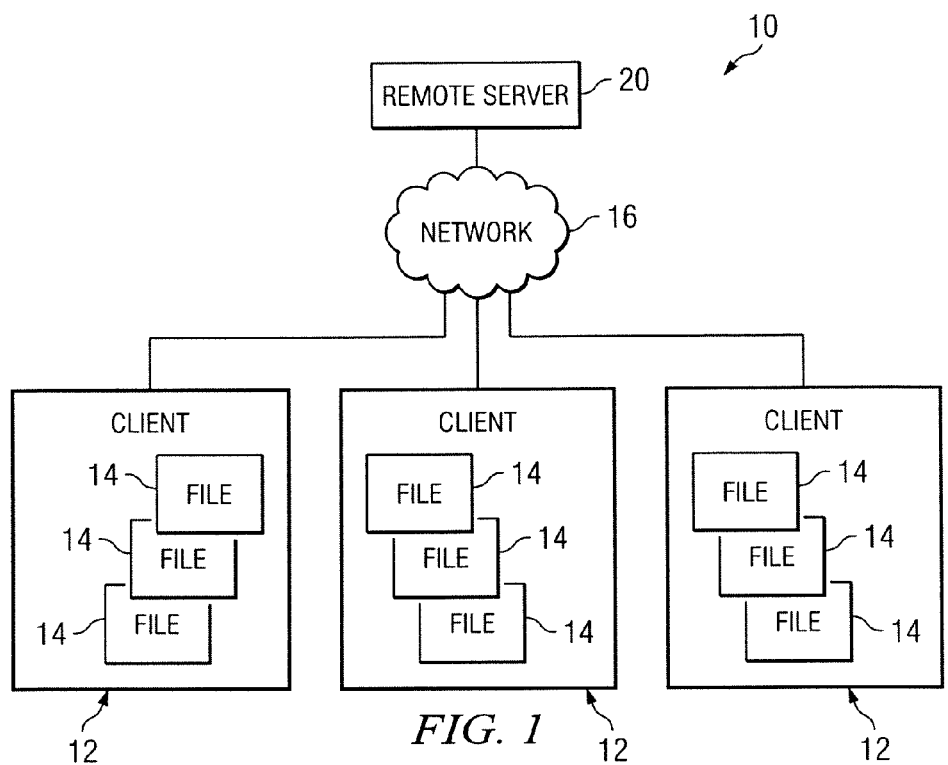
FIG. 1 is a block diagram illustrating a system for detecting malware using a remote server, according to the teachings of the present disclosure.

FIG. 1 is a block diagram illustrating a system 10 for detecting malware using a remote server, according to the teachings of the present disclosure. System 10 generally includes one or more clients 12 storing one or more files 14, a network 16, and a remote server 20. According to the embodiment, client 12 generates a hash value of any new or updated file 14 and transmits the hash value to remote server 20 over network 16 to detect the presence of malware in file 14. If remote server 20 detects the presence of malware in file 14, then client 12 may take any appropriate action to prevent the malware from infecting client 12.

Client 12 may refer to any suitable device operable store files 14. Client 12 may include, for example, a personal digital assistant, a computer such as a laptop, a cellular telephone, a mobile handset, or any other device operable to store file 14. Client 12 may include any operating system such as MS-DOS, PC-DOS, MAC-OS, WINDOWS, UNIX, OpenVMS, or other appropriate operating systems, including future operating systems.

File 14 may refer to any suitable data stored at client 12. For example, file 14 may be an executable file. An executable file, also referred to as a binary file, refers to data in a format that a processor may execute. File 14 may also include other data formats, such as a dynamic link library file, a data file, or any other suitable file that may be vulnerable to malware.

Network 16 may refer to any interconnecting system capable of transmitting audio, video, signals, data, messages, or any combination of the preceding. Network 16 may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

Network 16 may utilize protocols and technologies to transmit information. Example protocols and technologies include those described by the Institute of Electrical and Electronics Engineers, Inc. (IEEE) 802.xx standards such as 802.11, 802.16, or WiMAX standards, the International Telecommunications Union (ITU-T) standards, the European Telecommunications Standards Institute (ETSI) standards, Internet Engineering Task Force (IETF) standards, the third generation partnerships project (3GPP) standards, or other standards.

Remote server 20 may refer to any suitable device operable to process requests from client 12. Examples of remote server 20 may include a host computer, workstation, web server, file server, a personal computer such as a laptop, or any other device operable to process requests from client 12. Remote server 20 may include any operating system such as MS-DOS, PC-DOS, MAC-OS, WINDOWS, UNIX, OpenVMS, or other appropriate operating systems, including future operating systems.

In one embodiment, one or more files 14 on clients 12 may be infected with malware. Once malware infects files 14, the malware may damage expensive computer hardware, destroy valuable data, or compromise the security of sensitive information. Malware may spread quickly and infect many networks before a signature for detecting the malware may be developed, distributed, and installed in antivirus software. Further, malware may conceal itself from most antivirus software.

According to one embodiment of the disclosure, a system and method are provided to detect malware before it may infect clients and networks. This is effected, in one embodiment, by generating a hash value of any new or updated files 14 at client 12. Client 12 transmits the hash value to remote server 20 to detect the presence of malware in file 14. If remote server 20 detects the presence of malware in file 14, client 12 may take any appropriate action to prevent the malware from infecting client 12. For example, client 12 may prevent any pending or future operations for file 14. As another example, client 12 may restore file 14 to an earlier version. As another example, client 12 may delete file 14. Additional details of example embodiments of the disclosure are described in greater detail below in conjunction with portions of FIG. 2 and FIG. 3.

Figure 2:
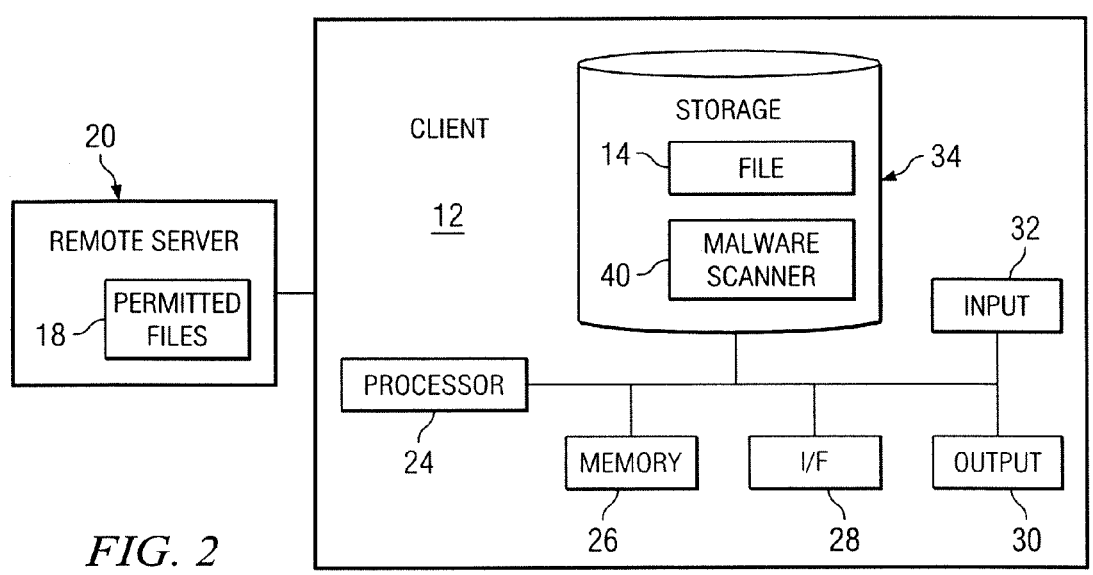
FIG. 2 is a block diagram illustrating an example client and an example remote server of the system of FIG. 1, according to one embodiment of the present disclosure.

FIG. 2 is a block diagram illustrating an example client 12 and an example remote server 20 of the system of FIG. 1, according to one embodiment of the present disclosure. In the illustrated embodiment, client 12 includes a processor 24, a memory device 26, a communication interface 28, an output device 30, an input device 32, and a storage device 34. Storage device 34 includes file 14 and a malware scanner 40.

Malware scanner 40 may refer to any suitable hardware and/or logic embodied in computer-readable media, and when executed, that is operable to detect malware in file 14. In the illustrated embodiment of the disclosure, malware scanner 40 resides in storage device 34. In other embodiments of the disclosure, malware scanner 40 may reside in memory device 26, or any other suitable device operable to store and facilitate retrieval of data and instructions.

According to one embodiment of the disclosure, malware scanner 40 may be operable to determine whether file 14 is a certain file type. For example, malware scanner 40 may determine whether file 14 is an executable file. If file 14 is an executable file, file 14 may be more vulnerable to malware. Malware scanner 40 may determine whether file 14 is an executable file by examining one or more properties of file 14. For example, if client 12 includes a WINDOWS operating system, malware scanner 40 may determine that file 14 is a Portable Executable (PE) by examining one or more headers of file 14. As another example, if client 12 includes a UNIX operating system, malware scanner 40 may determine that file 14 is an executable file by examining one or more permissions of file 14.

Malware scanner 40 may generate a hash value of file 14. For example, malware scanner 40 may generate a hash value of file 14 using one or more cryptography techniques, such as SHA-256. Malware scanner 40 transmits the hash value to remote server 20 to detect the presence of malware in file 14.

Malware scanner 40 may prevent at least one operation on file 14 until remote server 20 verifies that file 14 does not contain malware. An operation on file 14 may include, but is not limited to, accessing file 14, opening file 14, and executing file 14. For example, Malware scanner 40 may move file 14 to a particular quarantined location. As another example, malware scanner 40 may encrypt file 14 so that it may not be accessed. Additionally, the present disclosure contemplates many types of techniques to prevent at least one operation on file 14. Various embodiments may include some, all, or none of the enumerated techniques.

Remote server 20 detects the presence of malware in file 14 using one or more techniques. For example, remote server 20 may compare the hash value to a list of permitted files 18. Permitted files 18 may refer to a list of files 14 that client 12 is allowed to store and/or execute. Permitted files 18 may also include one or more permissible variations to files 14. In one embodiment, permitted files 18 may also be located on client 12. However, storing permitted files 18 on client 12 may reduce security because malware may corrupt permitted files 18. In addition, the present disclosure contemplates many alternative techniques for detecting the presence of malware in file 14. Some embodiments may include some, all, or none of the enumerated techniques.

If remote server 20 does not detect the presence of malware in file 14, remote server 20 may generate a notification to malware scanner 40 that indicates file 14 does not contain malware. In response, malware scanner 40 may allow any pending attempts to access file 14.

If remote server 20 detects the presence of malware in file 14, remote server 20 may generate a notification to malware scanner 40 that indicates file 14 contains malware. In response, malware scanner 40 may perform any suitable technique to prevent file 14 from infecting client 12, such as quarantining file 14.

According to one embodiment of the disclosure, malware scanner 40 may be operable to detect malware in an updated file 14. For example, a malware installer may create a non-executable file and then change the non-executable file to an executable by changing the first few bytes of the file. Thus, in the example, updated file 14 may originally be a non-executable file that changed to an executable file. Malware scanner 40 may treat updated file 14 as if it is new and generate a hash value of updated file 14 as described above. If remote server 20 detects the presence of malware in updated file 14, remote server 20 may generate a notification to malware scanner 40 that indicates updated file 14 contains malware. In response, malware scanner 40 may restore updated file 14 to its original state. Alternatively, malware scanner 40 may delete updated file 14. Additionally, the present disclosure contemplates many types of techniques to prevent updated file 14 from infecting client 12 with malware. Various embodiments may include some, all, or none of the enumerated techniques.

According to one embodiment of the disclosure, malware scanner 40 may be operable to provide a user with advisory messages. For example, if malware scanner 40 detects a new or updated file 14, malware scanner 40 may provide an advisory message to the user. As another example, if malware scanner 40 detects malware on file 14, malware scanner 40 may provide an advisory message to the user. The advisory message may be displayed using, for example, a window in a graphical application, a pop-up window, a dialog box, or any other suitable visual area operable to inform a user of vulnerability so that the user may take measures to prevent malware at client 12. Additional details of the other components of client 12 are described below.

Processor 24 may refer to any suitable device operable to execute instructions and manipulate data to perform operations for client 12. Processor 24 may include, for example, any type of central processing unit (CPU).

Memory device 26 may refer to any suitable device operable to store and facilitate retrieval of data, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Communication interface 28 may refer to any suitable device operable to receive input from remote server 20, send output to remote server 20, perform suitable processing of the input or output or both, communicate to other devices, or any combination of the preceding. Communication interface 28 may include appropriate hardware (e.g. modem, network interface card, etc.) and software, including protocol conversion and data processing capabilities, to communicate through a LAN, WAN, or other communication system that allows client 12 to communicate to other devices. Communication interface 28 may include one or more ports, conversion software, or both.

Output device 30 may refer to any suitable device operable for displaying information to a user. Output device 30 may include, for example, a video display, a printer, a plotter, or other suitable output device.

Input device 32 may refer to any suitable device operable to input, select, and/or manipulate various data and information. Input device 32 may include, for example, a keyboard, mouse, graphics tablet, joystick, light pen, microphone, scanner, or other suitable input device.

Storage device 34 may refer to any suitable device operable for storing data and instructions. Storage device 34 may include, for example, a magnetic disk, flash memory, or optical disk, or other suitable data storage device.

Figure 3:
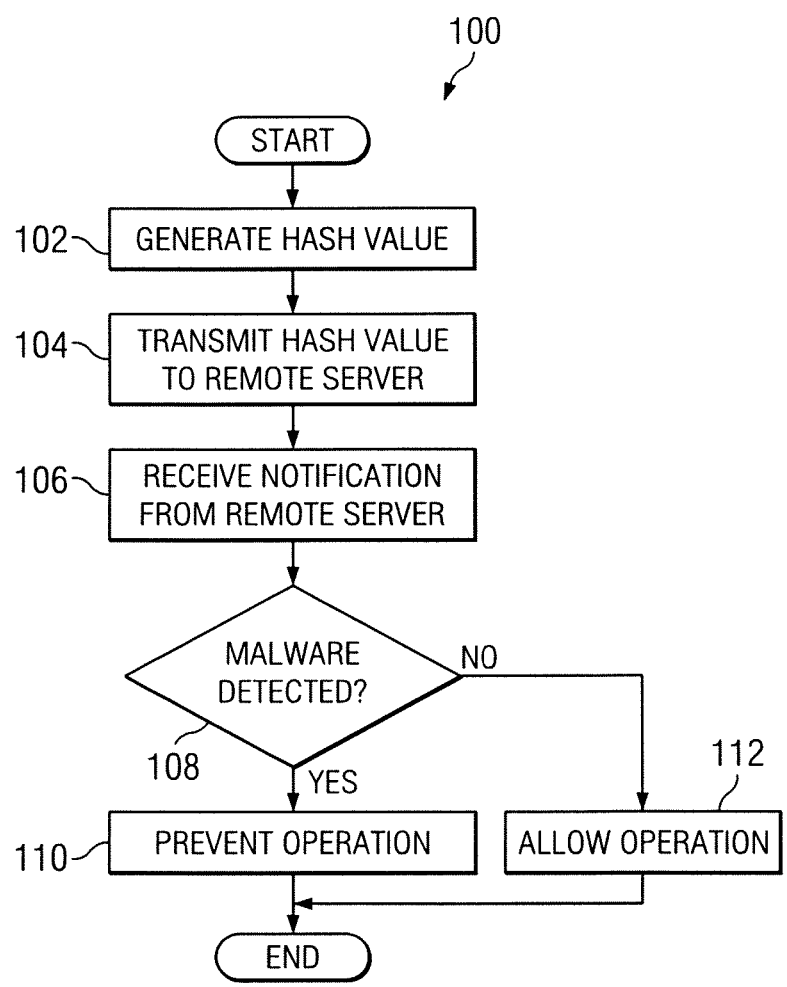
FIG. 3 is a flow diagram illustrating a method for detecting malware using a remote server, according to one embodiment of the present disclosure.

FIG. 3 is a flow diagram illustrating a method 100 for detecting malware using a remote server, according to one embodiment of the present disclosure. The method begins at step 102 where a client generates a hash value for a file. For example, a hash value for a file may be generated using one or more cryptography techniques, such as SHA-256. Next, at step 104, the hash value is transmitted to a remote server to detect the presence of malware in the file.

At step 106, the client receives a notification from the remote server indicating whether the file includes malware. If malware has been detected in the file at step 108, the method proceeds to step 110 where at least one operation is prevented for the file. For example, an operation on file may include, but is not limited to, accessing the file, opening the file, and executing the file. Preventing the operation may include, for example, restoring the file to a previous state, deleting the file, encrypting the file, storing the file in a quarantined location, or any other suitable technique for preventing operations on the file. If malware has not been detected in the file at step 108, the method proceeds to step 112 where at least one operation is allowed for the file.

Thus, the method described herein improves current methods to detect malware. Hash values of new or updated files are generated and transmitted to a remote server to detect the presence of malware. If malware is detected, the user or administrator may be alerted to any changes to the files and may take any appropriate action to prevent the malware from infecting the client. Thus, the method provides protection against malware, including unknown malware and rootkits.

Numerous other changes, substitutions, variations, alterations and modifications may be ascertained by those skilled in the art and it is intended that the present disclosure encompass all such changes, substitutions, variations, alterations and modifications as falling within the spirit and scope of the appended claims. Moreover, the present disclosure is not intended to be limited in any way by any statement in the specification that is not otherwise reflected in the claims.

What is claimed is:

1. A method for detecting malware, comprising:
   determining, by a malware scanner on a client, that one or more bytes within a header of a non-executable file stored on the client have changed and caused the non-executable file to change into an executable file;
   in response to determining that the non-executable file has changed into the executable file:
   generating a hash value for a file;
   transmitting the hash value to a remote server;
   receiving a notification from the remote server indicating whether the file comprises malware; and
   preventing at least one operation on the file if the notification indicates the file comprises the malware.

2. The method of claim 1, further comprising detecting, at the remote server, whether the file comprises the malware by comparing the hash value to one or more permitted files.

3. The method of claim 1, wherein preventing at least one operation on the file if the notification indicates the file comprises the malware comprises encrypting the file.

4. The method of claim 1, wherein preventing at least one operation on the file if the notification indicates the file comprises the malware comprises deleting the file.

5. The method of claim 1, further comprising generating an advisory message for a user that indicates the file comprises the malware in response to receiving the notification from the remote server indicating that the file comprises the malware.

6. The method of claim 1, further comprising allowing at least one operation on the file if the file does not comprise the malware.

7. A system for detecting malware, comprising:
a storage device; and
a processor, the processor operable to execute a program of instructions operable to:
determine that one or more bytes within a header of a non-executable file stored on the client have changed and caused the non-executable file to change into an executable file;
in response to determining that the non-executable file has changed into the executable file:
generate a hash value for a file;
transmit the hash value to a remote server;
receive a notification from the remote server indicating whether the file comprises malware; and
prevent at least one operation on the file if the notification indicates the file comprises malware.

8. The system of claim 7, wherein the program of instructions is further operable to detect whether the file comprises the malware by comparing the hash value to one or more permitted files.

9. The system of claim 7, wherein the program of instructions is further operable to encrypt the file.

10. The system of claim 7, wherein the program of instructions is further operable to delete the file.

11. The system of claim 7, wherein the program of instructions is further operable to generate an advisory message for a user that indicates the file comprises the malware, the advisory message generated in response to receiving the notification from the remote server indicating that the file comprises the malware.

12. The system of claim 7, wherein the program of instructions is further operable to allow at least one operation on the file if the file does not comprise the malware.

13. Logic encoded in non-transitory media, the logic being operable, when executed on a processor, to:
determine that one or more bytes within a header of a non-executable file stored on the client have changed and caused the non-executable file to change into an executable file;
in response to determining that the non-executable file has changed into the executable file:
generate a hash value for a file;
transmit the hash value to a remote server;
receive a notification from the remote server indicating whether the file comprises malware; and
prevent at least one operation on the file if the notification indicates the file comprises malware.

14. The logic of claim 13, wherein the logic is further operable to detect whether the file comprises the malware by comparing the hash value to one or more permitted files.

15. The logic of claim 13, wherein the logic is further operable to encrypt the file.

16. The logic of claim 13, wherein the logic is further operable to delete the file.

17. The logic of claim 13, wherein the logic is further operable to generate an advisory message for a user that indicates the file comprises the malware in response to receiving the notification from the remote server indicating that the file comprises the malware.

18. The logic of claim 13, wherein:
the notification from the remote server indicates that the file comprises malware; and
the logic is further operable when executed to restore the executable file back to the non-executable file.

19. The method of claim 13, wherein the notification from the remote server indicates that the file comprises malware, and the method further comprises:
restoring the executable file back to the non-executable file.

20. The system of claim 7, wherein:
the notification from the remote server indicates that the file comprises malware; and
the processor is further operable to restore the executable file back to the non-executable file.

* * * * *